United States Patent

Nakane

[15] 3,657,929
[45] Apr. 25, 1972

[54] ACCELEROMETERS

[72] Inventor: Hiroshi Nakane, Sagamihara, Japan

[73] Assignee: Kabushiki Kaisha Doboku Sokki Senta, Tokyo, Japan

[22] Filed: Feb. 10, 1970

[21] Appl. No.: 10,151

[52] U.S. Cl. ............................................................73/517
[51] Int. Cl. ......................................................G01p 15/08
[58] Field of Search ...........................................73/517, 514

[56] References Cited

UNITED STATES PATENTS

| 9,236 | 8/1852 | Stearns et al. | 73/535 X |
| 2,599,539 | 6/1952 | Boyd et al. | 73/514 X |

Primary Examiner—Jerry W. Myracle
Attorney—Waters, Roditi, Schwartz and Nissen

[57] ABSTRACT

An accelerator comprises a pendulum mounted on a hollow rotating shaft for pivotable movement about an axis transverse of the shaft and offset from the axis of rotation thereof. A detecting rod is coupled to the inner end of the pendulum to be displaced thereby when the pendulum is subjected to acceleration variation in the longitudinal direction of the shaft, the rod undergoing displacement in an amount proportional to the change in acceleration.

8 Claims, 2 Drawing Figures

Patented April 25, 1972

3,657,929

INVENTOR
Hiroshi Nakane

ACCELEROMETERS

BRIEF SUMMARY OF THE INVENTION

A conventional accelerometer is generally constructed to detect acceleration by utilizing a pendulum kept at rest by the action of gravity, and when the pendulum is subjected to an external force, the pendulum is deflected in accordance with the acceleration. If this type of accelerometer is attached to a body, whose position relative to gravitational forces always changes, such as an aircraft, a land vehicle or the like, the position of the accelerometer is also changed, so that the pendulum is subjected to the influence of the change of the horizontal component of gravity and the influence of the acceleration change caused by the action of an external force. When the change of acceleration is substantially equal in magnitude to gravity, it cannot be distinctly detected whether the accelerometer has recorded change of position or change of acceleration. It is conventional to make the pendulum mechanically rigid to avoid the influence of gravity, but this has the disadvantage that no sharp deflection is shown responsive to small acceleration changes.

The present invention contemplates the elimination of the aforesaid deficiencies and to this effect a pendulum is kept at a predetermined position by centrifugal force rather than at rest under the action of gravity, and according to the invention the pendulum is pivotally mounted on a rotating shaft so as to be swingable in the longitudinal direction of the shaft, a detecting rod being connected to the pendulum such that when the pendulum is kept at a predetermined position by centrifugal force caused by the rotation thereof, the detecting rod remains unchanged in position, but when the pendulum is deflected from its predetermined position by the action of an external force caused by the change of acceleration, the rod is moved in proportion to the amount of the deflection.

DETAILED DESCRIPTION

Figure 1:
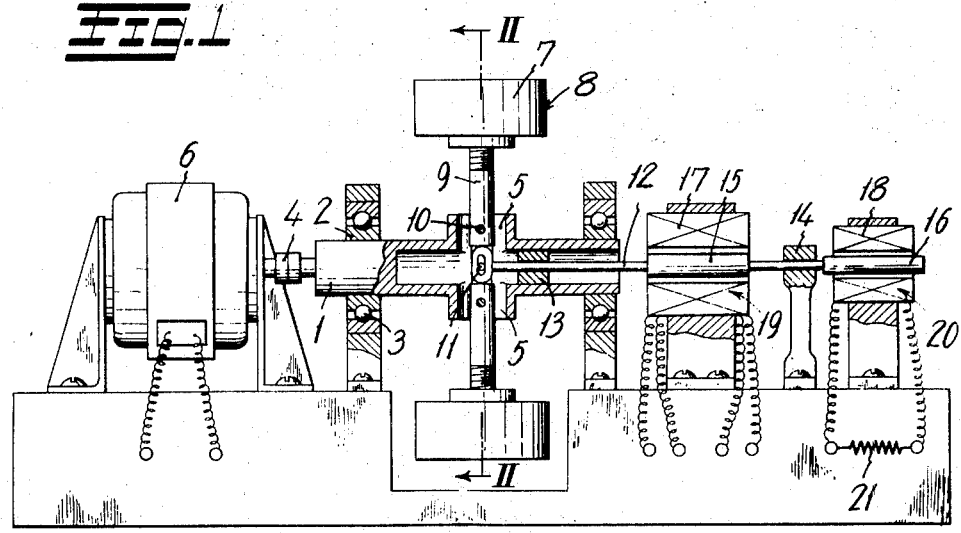
FIG. 1 is a side view, partly in section, of an embodiment according to this invention.
Figure 2:
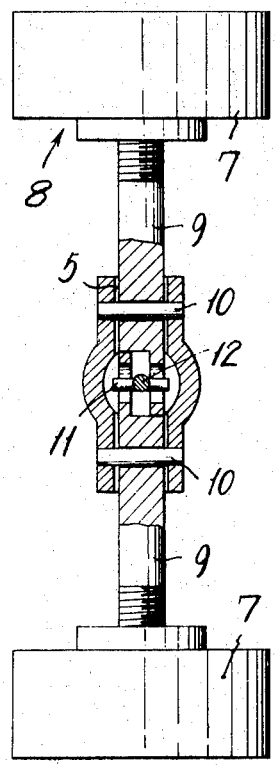
FIG. 2 is an enlarged sectional view taken along the line II—II in FIG. 1.

Referring to the drawing, numeral 1 denotes a hollow rotating shaft rotatably supported by a machine frame 2 through bearings 3, and the hollow shaft 1 is connected at one end to an electric motor 6 through a coupling 4. The shaft 1 is provided at its middle portion with a pair of opposed bores 5. A pendulum 8 having a swingable rod 9 with a weight 7 is attached in each bore 5 by being pivotally supported on an axle 10. The inner end of each swingable rod 9 is formed as a lug with a slot and is connected through a slidable pin 11 to one end of a detecting rod 12 rotatably and slidably supported by guide rings 13 and 14. The detecting rod 12 has iron cores 15 and 16 secured thereto, and these cores 15 and 16 are inserted in openings of respective annular coils 17 and 18, so that a differential transformer type converting mechanism 19 is formed by the iron core 15 and the coil 17, while a brake mechanism 20 is formed by the iron core 16 and the coil 18. The amount of movement of the detecting rod 12, which moves in accordance with the acceleration, is converted into an electric output to be detected by the differential transformer type converting mechanism 19, while the movement of the detecting rod 12 is controlled by the brake mechanism 20. Numeral 21 denotes a resistor connected to the coil 18.

If, now, the hollow shaft 1 is rotated by the electric motor 6 to exert a centrifugal force on the pendulum 8, the pendulum 8 always rotates along a predetermined locus circle, so that the detecting rod 12 connected to the inner end of the swingable rod 9 is not moved but remains in a stationary condition. Moreover, even when the centrifugal force is large in comparison with gravity, and the accelerometer itself is changed in position to change the vertical component of gravity acting on the pendulum 8, the pendulum 8 is not influenced thereby, and the rod 12 remains stationary, and only when a change of acceleration, caused by external force, in the longitudinal direction of the detecting rod 12 acts on the weight 7, will the pendulum 8 be deflected or inclined about its intermediate pivot in accordance therewith. Accordingly, the detecting rod 12 connected to the inner end of the pendulum 8 is not subjected to the influence of gravity but moves in accordance with the change of acceleration caused by the external force, that is, in proportion to the deflection of the pendulum, while being controlled in movement in the longitudinal direction by the brake mechanism 20, the amount of movement of rod 12 being detected in the form of an electric output through the differential transformer type converting mechanism 19.

Thus, in this invention, a pendulum is attached to a rotating shaft so as to be pivotable in the longitudinal direction of the shaft (i.e., about an axis transverse of said shaft), and a detecting rod is connected to the pendulum such that when the pendulum assumes a predetermined position under centrifugal force caused by the rotation of the pendulum, the detecting rod remains stationary and only when an external force acts on the pendulum by acceleration forces having a component in the longitudinal direction of the shaft, will the pendulum be inclined in the longitudinal direction of the shaft in response to the acceleration, so that the acceleration is detected by the magnitude of the movement of the detecting rod which moves in proportion to the amount of inclination or deflection of the pendulum. Accordingly, as compared with the conventional pendulum which is at rest under gravity, the weight of the pendulum can be substantially increased in mass owing to centrifugal force even if the actual mass thereof is small, so that the mass can be of small size. Additionally, the swingable rod supporting the weight is also increased in its supporting force by the centrifugal force, so that the rod is not required to be increased in mechanical rigidity. In addition thereto, this invention is especially advantageous in that sensitive acceleration detection can be obtained without influence by gravity and irrespective of the positions of the accelerometer itself.

What is claimed is:

1. An accelerometer comprising a rotatable shaft, means for rotating said shaft about a longitudinal axis of rotation, a pendulum pivotably connected to said shaft for movement about an axis transverse of said shaft, a detecting rod connected to said pendulum to remain at rest when the pendulum assumes a predetermined position by centrifugal force caused by the rotation of the shaft, the detecting rod undergoing displacement upon pivotal deflection of the pendulum from the predetermined position, under the action of an external force caused by a change of acceleration in the longitudinal direction of said shaft, said detecting rod being moved in proportion to the amount of the deflection, a first iron core secured on said detecting rod, a first outside coil cooperating with said first core to form a differential transformer type detecting mechanism, a second iron core secured to said detecting rod and a second outside coil cooperating with said second core to form a brake mechanism for said rod.

2. An accelerometer according to claim 1, wherein said rotating shaft is hollow and has a middle portion with a pair of opposed bores, said pendulum comprising a pair of arms each carrying a weight at the free end thereof, each arm being pivotally mounted in a respective bore.

3. An accelerometer according to claim 1, wherein said pendulum comprises a pair of opposed arms each pivotally connected to said shaft, and means coupling the arms to said rod to displace the rod when the pendulum is subjected to change of acceleration in the longitudinal direction of said shaft.

4. An accelerometer as claimed in claim 3 wherein said shaft is hollow and said rod extends axially therein, said shaft having opposed radial bores, said arms extending in said bores.

5. An accelerometer as claimed in claim 4 wherein said means coupling the arms to said rod comprises lugs on said arms and pin slidably and rotatably mounted in said lugs to allow only conjoint pivotal movement of said arms, said pin being secured to said rod.

6. An accelerometer as claimed in claim 5 comprising an axle pivotably connecting each arm to said shaft, the pin and axles being aligned perpendicular to said shaft.

7. An accelerometer as claimed in claim 6 wherein each said axle passes through the center of each arm.

8. An accelerometer as claimed in claim 7 wherein said lugs are in facing relation and have respective slots accommodating the pin.

* * * * *